United States Patent [19]

Yoon et al.

[11] Patent Number: 5,133,037
[45] Date of Patent: Jul. 21, 1992

[54] POLYMERIC OPTICAL MODULATOR AND WAVEGUIDING MEDIA

[75] Inventors: Hyun N. Yoon, New Providence; Chia C. Teng, Piscataway, both of N.J.

[73] Assignee: Hoechst Celanese Corp, Somerville, N.J.

[21] Appl. No.: 712,307

[22] Filed: Jun. 7, 1991

[51] Int. Cl.⁵ .......................... G02B 6/10; H03F 7/00
[52] U.S. Cl. ......................................... 385/132; 385/2; 385/131; 385/143; 385/145; 359/332
[58] Field of Search ............... 350/96.11, 96.12, 96.13, 350/96.14, 96.30, 96.29, 96.34; 307/425, 430

[56] References Cited

U.S. PATENT DOCUMENTS

| | | | |
|---|---|---|---|
| 4,796,971 | 1/1989 | Robello et al. | 350/96.34 |
| 4,886,339 | 12/1989 | Scozzafava et al. | 350/96.34 |
| 4,887,884 | 12/1989 | Hayden | 350/96.29 |
| 4,932,737 | 6/1990 | Yoon et al. | 350/96.14 |
| 4,932,738 | 6/1990 | Haas et al. | 350/96.14 |
| 4,936,644 | 6/1990 | Raskin et al. | 350/96.14 |
| 4,936,645 | 6/1990 | Yoon et al. | 350/96.14 |
| 4,946,235 | 8/1990 | Scozzafava et al. | 350/96.34 |
| 5,007,696 | 4/1991 | Thackara et al. | 350/96.14 |
| 5,008,043 | 4/1991 | Robello et al. | 350/96.14 X |

Primary Examiner—Brian Healy
Attorney, Agent, or Firm—M. W. Ferrell

[57] ABSTRACT

A waveguiding media of polymeric materials is disclosed and claimed. In a preferred embodiment both core and cladding include $X^{(2)}$ materials poled to a non-centrosymmetric structure. Materials are selected so that the index difference between core and cladding remains relatively constant before and after poling so as to allow for efficient fabrication.

18 Claims, 2 Drawing Sheets

POLYMERIC OPTICAL MODULATOR AND WAVEGUIDING MEDIA

CROSS REFERENCE TO RELATED CASES

The subject matter of the present case is related to that of U.S. Pat. No. 4,936,645 wholly owned by same assignee as the present invention as well as U.S. patent application Ser. No. 07/691,158, pending, which is a continuation of U.S. patent application Ser. No. 07/463,080, filed on Jan. 10, 1990, now abandoned.

TECHNICAL FIELD

The present case relates generally to electro-optically active waveguiding media and more specifically to polymeric single-mode multilayer structures having small refractive index differences between layers.

BACKGROUND OF INVENTION

The theoretical principles underlying the operation of waveguides and related devices is well known to those of skill in the art. Design and fabrication of practical devices on the other hand, has been difficult and is the object of ongoing research. Due to material properties and the demanding parameters involved, fabrication of one of the preferred type of waveguiding devices, single mode waveguides, is particularly challenging and may often be the result of trial and error procedures to obtain the desired end product. Refractive index differences of less than one percent variance from design values are often required as will be appreciated from the discussion that follows.

A dispersion constant b, defined in equation one (1) below was calculated for a slab waveguide (i.e. two-dimensional waveguide) consisting of three (3) planar layers; an upper and lower cladding layer and a core therebetween. For purposes of calculation, the core thickness was taken as four (4) microns and the upper and lower cladding layers had a refractive index of 1.630. The core index was varied from 1.630 to 1.710 to generate a series of dispersion curves as a function of index difference between core and cladding. For purposes of convenience a propagation constant b is utilized where:

$$b = \frac{N_{eff}^2 - N_{cl}^2}{N_{co}^2 - N_{cl}^2} \quad (1)$$

and N eff is the effective index of the mode, Ncl and Nco are the cladding and core indices respectively. The results of the calculation are shown in FIG. 1.

As may be seen, a structure with a four (4) micron thick core will quickly convert from a single mode device to a dual mode device when the index difference exceeds about 0.007. This would have a devastating effect on bandwidth and operating characteristics of practical single mode devices. In general, the problem is aggravated in systems with polymeric devices which are poled to non-centrosymmetric structures during fabrication since the poling step may introduce index changes in the various layers of the device. For example, polymeric electro-optic materials are known to change refractive index, or more accurately, refractive properties, upon poling to a stable non-centrosymmetric structure. As used hereinafter refractive index refers to the index presented to the transverse electric mode of the light travelling in a waveguide, that is, the field in the general direction of arrows 30 in FIG. 2.

SUMMARY OF INVENTION

The present invention provides a product with small index differences between core and cladding in poled structures having non-centrosymmetric molecular orientation as would be the case with an electro-optic modulator produced from electrically poled polymeric materials. The same is accomplished by providing a waveguiding media including a core material with a first refractive index and juxtaposed thereabout a cladding material with a refractive index lower than the first refractive index to define the waveguide. The media is poled in an electric field to produce a non-centrosymmetric, electro-optically active $\chi^{(2)}$ core operative to modulate light in response to an electrical signal provided. Both core and cladding change their refractive index in response to an electrical poling process so that the refractive index difference therebetween remains relatively constant whether they are in a poled or unpoled condition. In other words, by relatively constant it is meant that the index difference between the core and cladding material when both are poled is a smaller index difference than would be the case if the core material is in a poled or oriented state and the cladding was not. More preferably, the index difference remains substantially the same between materials if both are poled or both are unpoled within close numerical tolerances. As will be appreciated by those of skill in the art, the index difference between core and cladding layers need not be absolutely constant but could revolve around small predetermined values.

Generally speaking the index difference between core and cladding is less than about 0.020; typically from about 0 to about 0.015 and preferably less than about 0.010 for single mode operation in both the poled and unpoled condition. In accordance with the invention either active or passive cladding is utilized, active cladding, that is, with a substantial $\chi^{(2)}$ value, generally being the most preferred species. Either sidechain $\chi^{(2)}$ polymers may be employed as an active material or a guest-host material is feasible. Optionally, a suitable main chain $\chi^{(2)}$ material may be used as a polable species for either core or cladding.

BRIEF DESCRIPTION OF DRAWINGS

The invention is described in detail herein with reference to the figures, in which.

DETAILED DESCRIPTION

Figure 1:
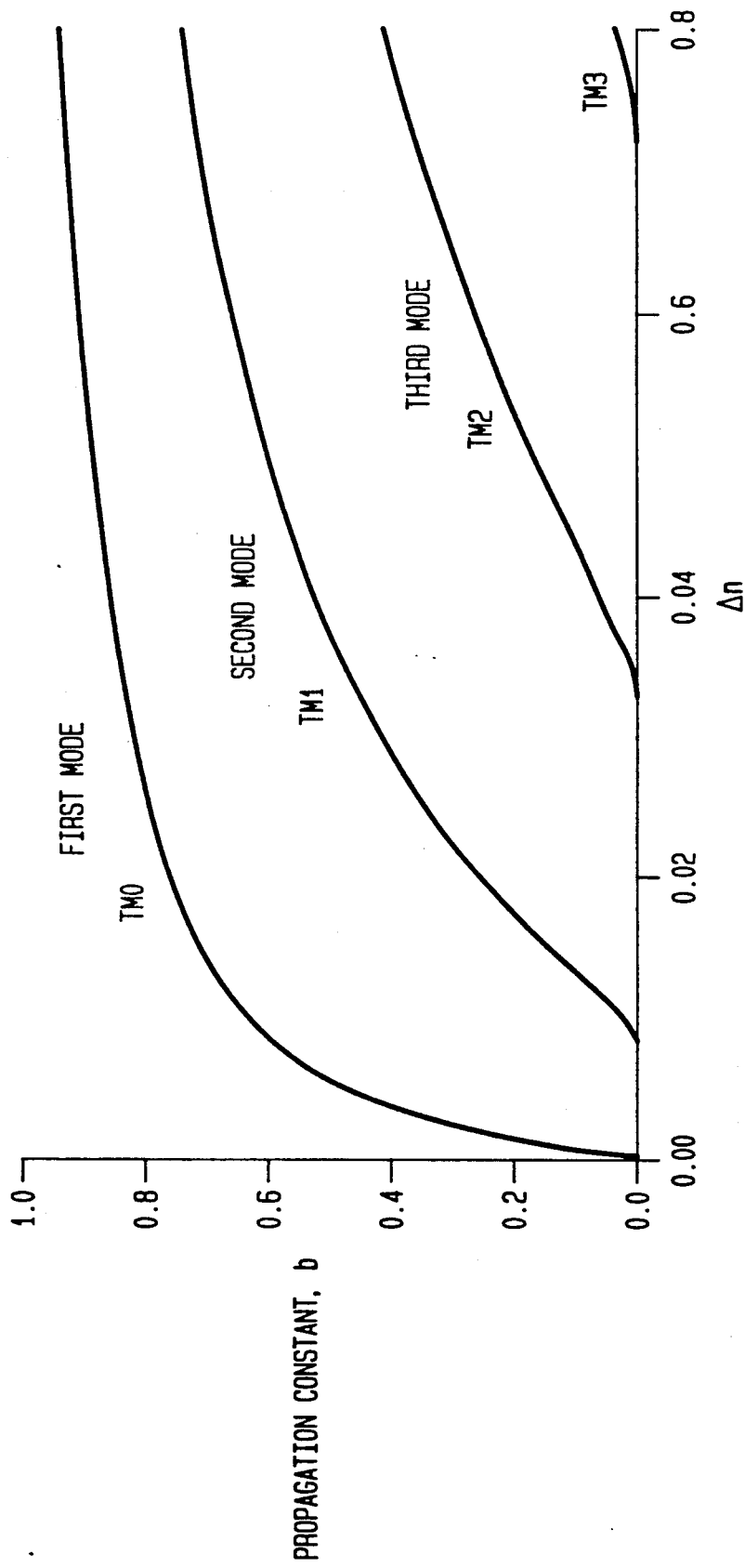
FIG. 1 is a diagram showing the number of possible propogation modes of a 4 micron thick 2-dimensional waveguide.

For purposes of exemplification and not by way of limitation, the present invention is described hereinafter in connection with several embodiments turning first to the synthesis of polymers useful as layer materials of the inventive structures. While polable materials of any type, such as guest-host materials may be employed, polymers of the general structure:

where P is a backbone polymer unit, S a spacer group of 1-20 carbon atoms, M a sidechain and preferably an NLO active chromophore and N a copolymeric unit which enhances isotropic characteristics of the media. To achieve the desired refractive index combination in a multilayered waveguiding structure, polymers such as those described herein may be blended for example, with methyl methacrylate or each other to obtain the necessary optical relationships or copolymers of different ratios having different optical characteristics may be prepared as needed.

EXAMPLE I

This Example illustrates the preparation of an isotropic 50/50 copolymer of 4-[N-(2-methacroyloxyethyl)-N-methylamino]-4'-nitrostilbene and methyl methacrylate as shown in structure (II) below.

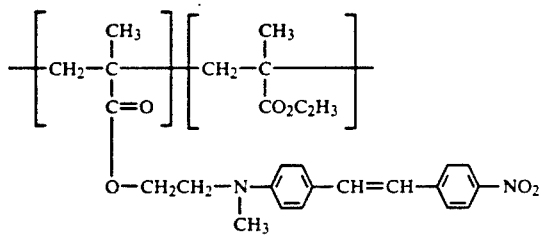

A.

4-[N-(2-Hydroxyethyl)-N-methylamino]benzaldehyde

A 2 liter three (3) necked flask fitted with a mechanical stirrer, thermometer and condenser is charged with 134 g of 2-(methylamino)ethanol, 74.4 g of 4-fluorobenzaldehyde, 1 ml of Aliquat 336, 750 ml of dimethylsulfoxide and 82.8 g of anhydrous potassium carbonate. The mixture is heated at 95° C. for three (3) days. The product mixture is cooled and poured into 3 liters of ice water. The resultant solid precipitate is filtered, washed with water, and vacuum dried. The crude product is recrystallized from toluene, m.p. 72° C.

B.

4-[N-(2-Hydroxyethyl)-N-methylamino]-4'-nitrostilbene

A one liter three (3) necked flask fitted with a dropping funnel, mechanical stirrer and condenser is charged with 34.35 g of 4-nitrophenylacetic acid, and piperidine (16.2 g) is added dropwise over a period of 30 minutes. At the end of the addition, a 33.62 g quantity of 4-[N-(2-hydroxyethyl)-N-methylamino]benzaldehyde is added.

The mixture is heated at 100° C. for three (3) hours, and at 130° C. for three (3) hours. After cooling, the resultant semi-solid mass is ground in ethanol in a blender. The particulate solid is filtered, washed, and vacuum dried. The crude product is recrystallized from chlorobenzene, m.p. 185°-187° C.

C.

4-[N-(2-methacroyloxyethyl)-N-methylamino]-4'-nitrostilbene

A 1 liter three (3) necked flask fitted with a thermometer, condenser, dropping funnel with argon inlet and magnetic stirrer is charged with 5 g of 4-[N-2-hydroxyethyl)-N-methylamino]-4'nitrostilbene, 5 g of triethylamine and 400 ml of dichloromethane. The mixture is heated to 35° C., and 3.5 g of methacroyl chloride is added dropwise over a 30 minute period. After stirring at 35° C. for four (4) hours, another 3.5 g of methacroyl chloride is added and the reaction medium is stirred for about 20 hours at 35° C. The product mixture is extracted three (3) times with distilled water. The organic phase is dried over magnesium sulfate, and the solvent is evaporated. The resultant crude product is vacuum dried and then recrystallized from acetonitrile, m.p. 142°-148° C.

D.

50/50 mole ratio Isotropic Acrylic Copolymer

4-[N-(2-Methacroyloxyethyl)-N-methylamino]-4'-nitrostilbene (2 g) is suspended in 20 ml of chlorobenzene in a reactor, and the mixture is degassed one (1) hour. To the suspension is added on equimolar amount of methyl methacrylate and one mole percent of azobisisobutyronitrile.

The reactor is capped and placed in a 75° C. oil bath for a period of about 18 hours. The product mixture than is poured into methanol to precipitate the copolymer. The solid copolymer is recovered by filtration, and vacuum dried. The copolymer illustrated has a Tg of about 140° C. and a molecular weight of about 60,000 to 80,000.

EXAMPLE II

This Example illustrates the preparation of isotropic acrylic copolymers and terpolymers in accordance with the present invention.

The procedures of Example I are followed, employing selected combinations of monomers.

A 35/65 copolymer of 4-[N-(2-methacroyloxyethyl)-N-methylamino]-4'-nitrostilbene and methyl methacrylate has a weight average molecular weight of 60,000 to 80,000 and a Tg of about 130° C.

A 25/75 copolymer of 4-[N-2-methacroyloxyethyl)-N-methylamino]-4'-nitrostilbene and butyl methacrylate has a weight average molecular weight in the range of 60,000-80,000, and exhibits a Tg of 71° C.

A 25/75 copolymer of 4-[N-(2-methacroyloxyethyl)-N-methylamino]-4'-nitrostilbene and methyl methacrylate has a weight average molecular weight in the range of 60,000-80,000, and exhibits a Tg of 120° C.

Utilizing the Example I procedures, the following copolymers and terpolymers are prepared:
(50/50) 4-[N-[3-(2-chloro)acroyloxypropyl]amino]-4'-cyanostilbene/methyl acrylate
(90/10) 4-[N-8-(2-phenyl)acroyloxyoctyl]-N-ethylamino]-4'-nitrostilbene/methyl methacrylate
(30/70) 4-[N-[2-(2-trifluoromethyl)acroyloxyethyl]-N-methylamino]-4'-nitrostilbene/hexyl acrylate
(50/50) [1-(2-methacroyloxyethyl)-N-methylamino]-4'-nitrostilbene/methyl 2-(4-methyphenyl)acrylate
(75/125/125) 4-[N-(4-(4-acroyloxybutyl)-N-butylamino]-4'-nitrostilbene/methyl acrylate/styrene The prepared polymers have a combination of physical and optical properties which are similar to those of the isotropic acrylic copolymer described in Example I.

EXAMPLE III

This example illustrates a polymer which is useful as a cladding material in an electro-optic device, although it is without substantial $\chi^{(2)}$ NLO optical activity. An isotropic polymer of the structure:

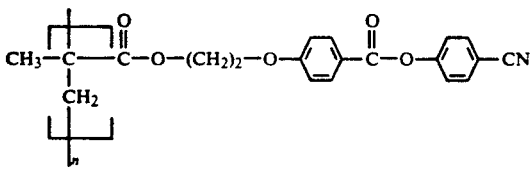

is prepared by conventional means as this general class of compounds is well-known as shown for example in Side Chain Liquid Crystal Polymers, McCardle, ed., Chapman and Hall, 1989. To ensure isotorpic behavior however, a 2 carbon spacer is used for the side chain in the following synthesis procedure which is substantially that described in U.S. Pat. No. 4,808,332:

Methyl-para-hydroxy benzoate is reacted in base with 2-bromoethanol to form methyl para-2-hydroxyethyl benzoate which in turn is reacted with para-cyano phenol to form an alcohol of the structure:

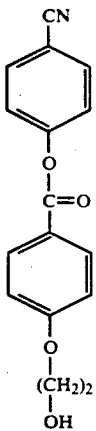

The above alcohol is reacted with methacroyl chloride to form the monomer from which the polymer is formed.

Such polymers, while not exhibiting substantial $\chi^{(2)}$ activity, do change their refractive index in a manner similar to the polymers of examples 1 and 2 upon poling in an electric field as hereinafter described because the sidechain has a relatively high anisotropy of polarizability and dipole moment (roughly 5.5 Debye) as is typically the case with active polymeric materials as well. For example, this polymer has a refractive index of about 1.62 in an unpoled state and about 1.63 when poled at 100 volts per micron.

EXAMPLE IV

Figure 2:
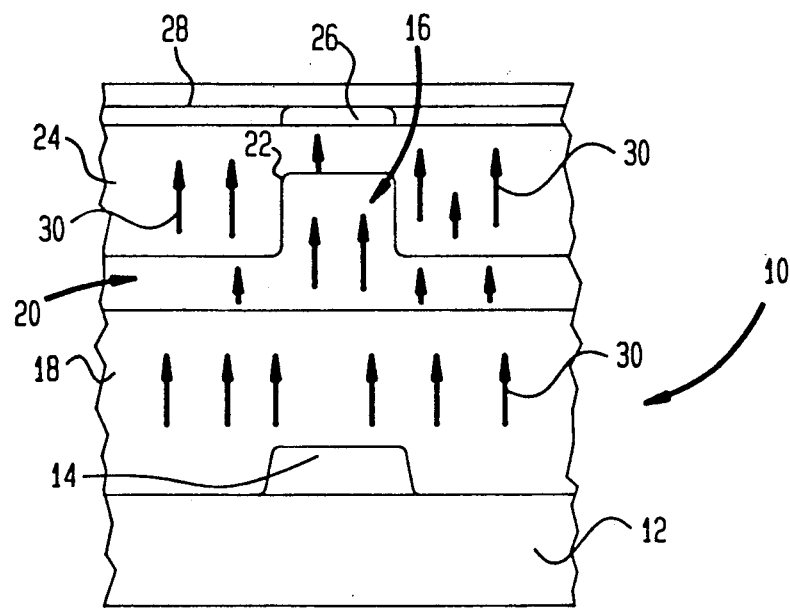
FIG. 2 is a schematic section of a waveguiding device produced in accordance with the present invention, generally along line 2—2' of FIG. 3.
Figure 3:
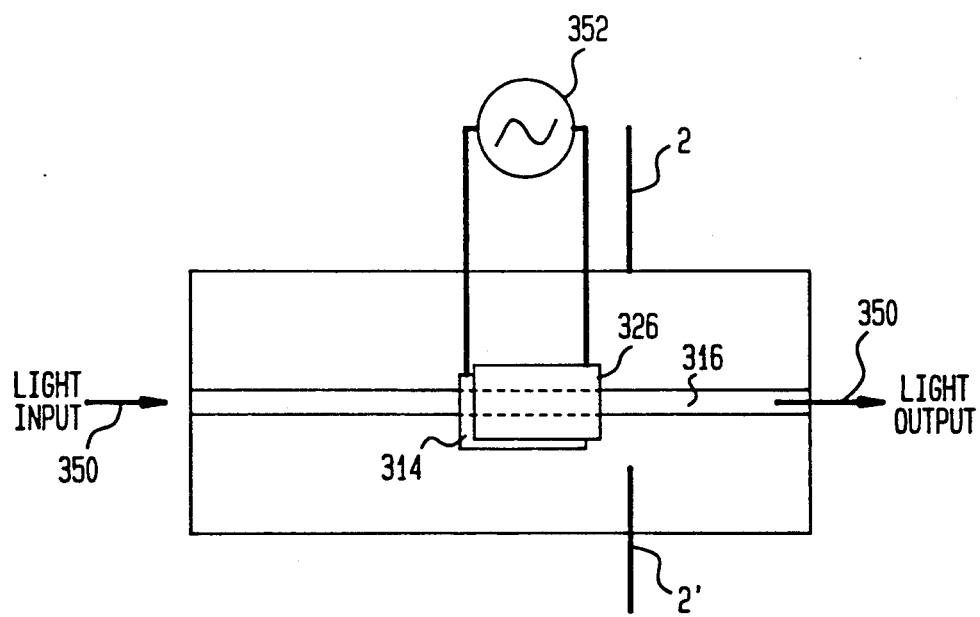
FIG. 3 is a top view of a waveguiding device wherein parts similar to those of FIG. 2 are designated 300 numerals higher.

This example illustrates the construction of an electro-optic rib-type (three dimensional as opposed to a slab type) waveguiding modulator of the pockels effect type as schematically depicted in FIG. 2 which is a view in section and elevation along line 2,2' of FIG. 3.

As will be appreciated by one of skill in the art, other devices, such as a periodically poled frequency doubler could be made by like methods.

A commercially available silicon wafer 12 may be used as a substrate for a waveguiding device 10 constructed in accordance with the present invention. An aluminum or gold strip electrode 14 is deposited and patterned by conventional techniques to be coextensive with a core portion 16 which is added later. Preferably, the substrate is suitably prepared using an adhesion promoter such as methacryl silane followed by baking at about 100° C. so that the structure will not delaminate.

A cladding layer 18 of a 35/65 copolymer of 4-[N-(2-metacroyloxyethyl)-N-methylamino]-4'-nitrostilbene/-methyl methacrylate prepared as in Example II is spin coated onto the substrate and over the electrode using a 20 percent solution in cyclohexanone at 2000 rpm to achieve a layer thickness of about 3 microns. Following coating, the layer is sequentially cured two (2) hours at 160° C., one (1) hour at 130° C. and one (1) hour at 110° C.

The 50/50 copolymer of example I is spin coated to form a core layer 20 in the same manner as layer 18, also to about 3 microns in thickness. A thin layer of aluminum (not shown), on the order of 100 Angstroms is added so that a rib 22 may be patterned using AZ-1518 photoresist available from Hoechst Celanese Corporation, 86 Morris Avenue, Summit, N.J. and preferably type D aluminum etch available from the Transene Corporation of Rawley, Mass. Layer 20 masked and reactive ion etching is used to remove roughly one half of the thickness of the layer except at 22 which is protected by the photoresist and aluminum.

After the photoresist and aluminum are removed, a very thin layer of 50/50 copolymer is spin coated over the layer 20 using a 7% solution in cyclohexanone to remove any imperfections.

A second cladding layer 24 is provided of the 35/65 copolymer used for the lower cladding layer 18 in the same manner as before. A second electrode 26 is patterned coextensively with rib 22 and a protective layer 28 may be added if so desired.

To achieve a non-centrosymmetric structure, device 10 is poled in an electric field so that the layers assume the orientation shown by arrows 30. This may be accomplished in any suitable manner but is preferably performed by heating device 10 above the glass transition temperature of the material of layers 18,20 and 24 and applying an electric field of 100 volts per micron or more to electrodes 14, 26. While the electric field is maintained, the device is cooled to below its glass transition temperature so that the polymer retains a stable, non-centrosymmetric structure. During poling, the refractive index of the core changes from about 1.63 to about 1.64 whereas the cladding changes from about 1.62 before poling to about 1.63 after poling at 100 volts per micron.

The single mode character of the waveguide is confirmed using a 1.34 micron wavelength laser beam and observing the exiting beam. Modulation of light may be achieved by applying an electric field to the electrodes while light is traveling in the guide as illustrated schematically in FIG. 3.

A light input provides light to the waveguide so that the beam indicated by arrows 350 propogates in the direction shown. A voltage signal is applied as indicated at 352 to electrodes 326, 314 to modulate beam 350 as desired in accordance with the Pockels' effect.

EXAMPLE V

Following the procedure of example IV, any of the polymeric materials of example II are selected so that the core material has a suitably higher index than the cladding layers.

EXAMPLE VI

Following the procedure of example IV, the copolymer of example I is used as the core layer 20 and the polymer of example III is used as cladding layers 18,24.

EXAMPLE VII

Following the procedure of example IV, a device 10 is constructed using the copolymer of example I as the core material and the cladding layers are a blend of the 50/50 copolymer of example I and the 35/65 copolymer of 4-[N-(2-methacroyloxyethyl)-N-methylamino]-4'-nitrostilbene and methyl methacrylate of example II in the ration of 3:1 is used as the cladding layers.

In each of examples V–VII the refractive index of the core material is approximately 1.63 (+ or −0.005) before poling at 100 volts/micron and approximately 1.64 (+ or −0.005) thereafter. The cladding shows a similar change from 1.62 to 1.63 as a result of the poling process.

While the present invention has been described in numerous embodiments, modifications and equivalents will be readily apparent to those of skill in the art. Such modifications and equivalents are within the spirit and scope of the present invention which is limited and defined only by the appended claims.

What is claimed is:

1. A waveguiding media comprising a polymeric core material and a polymeric cladding material thereabout wherein said core material has a refractive index higher than said cladding material and changes its refractive index when poled to a noncentrosymmetric structure in an electric field wherein said cladding material changes its refractive index when poled in said electric field, such that the index difference between said core and said cladding remains relatively constant before and after poling.

2. The waveguiding media in accordance with claim 1, wherein both the core and cladding increase their index of refraction in response to being poled to a stable non-centrosymmetric structure.

3. The waveguiding media in accordance with claim 2, wherein both the core and the cladding increase their refractive index more than about 0.005 upon poling from an unoriented to an oriented structure utilizing an electric field of about 100 volts per micron.

4. The waveguiding media in accordance with claim 1, wherein the index difference between the core and cladding is less than about 0.020.

5. The waveguiding media in accordance with claim 4, wherein the index difference between core and cladding is less than about 0.015.

6. The waveguiding media in accordance with claim 5, wherein the index difference between core and cladding is about 0.010 or less.

7. The waveguiding media in accordance with claim 1, wherein at least one of the core and cladding materials includes a polymer having the repeating unit:

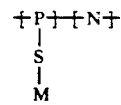

where P is a mainchain polymer unit, S is a spacer group having 1–20 carbon atoms, N is an optional comonomer unit and M is a moiety with a substantial dipole moment capable of being oriented in an electric field.

8. The waveguiding media according to claim 7, wherein the moiety is an NLO active moiety exhibiting a substantial $X^{(2)}$ value.

9. The waveguiding media according to claim 1, wherein both core and cladding include a polymer having the structure:

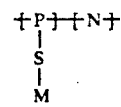

where P is a mainchain polymer unit, S is a spacer group having 1–20 carbon atoms, N is an optional comonomer and M is a moiety with a substantial dipole moment capable of being oriented in an electric field.

10. An electro-optic modulation device comprising in combination an active core layer incorporating organic $\chi^{(2)}$ molecules which are electrically poled to a stable non-centrosymmetric structure having a first predetermined refractive index associated with the direction of propagation of a light wave, which first index differs from the refractive index of the core material in an unpoled state and at least one cladding layer being electrically poled to a stable oriented structure having a second index of refraction associated with the direction of propagation of a light wave, said second index of refraction being lower than said first index of refraction; means for applying an electric field across said core and cladding layers, wherein the difference between said first and second indices of refraction is less than the difference between said first index of refraction and the index of refraction of the cladding material in an unpoled condition.

11. The waveguiding media in accordance with claim 10, wherein both the core and cladding increase their index of refraction in response to being poled to a stable non-centrosymmetric structure.

12. The waveguiding media in accordance with claim 11, wherein both the core and the cladding increase their refractive index more than about 0.005 upon poling from an unoriented to an oriented structure utilizing an electric field of about 100 volts per micron.

13. The waveguiding media in accordance with claim 10, wherein the index difference between the core and cladding is less than about 0.020.

14. The waveguiding media in accordance with claim 13, wherein the index difference between core and cladding is less than about 0.015.

15. The waveguiding media in accordance with claim 14, wherein the index difference between core and cladding is about 0.010 or less.

16. The waveguiding media in accordance with claim 10, wherein at least one of the core and cladding materials includes a polymer having the repeating unit:

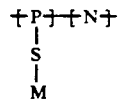

where P is a mainchain polymer unit, S is a spacer group having 1-20 carbon atoms, N is an optional comonomer unit and M is a moiety with a substantial dipole moment capable of being oriented in an electric field.

17. The waveguiding media according to claim 16, wherein the moiety is an NLO active moiety exhibiting a substantial $X^{(2)}$ value.

18. The waveguiding media according to claim 10, wherein both core and cladding include a polymer having the structure:

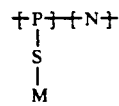

where P is a mainchain polymer unit, S is a spacer group having 1-20 carbon atoms, N is an optional comonomer and M is a moiety with a substantial dipole moment capable of being oriented in an electric field.

* * * * *